Jan. 1, 1957  D. C. EIPPER ET AL  2,775,821
APPARATUS FOR PRESETTING CUTTERS FOR USE IN A MACHINE TOOL
Filed May 25, 1953  2 Sheets-Sheet 1

INVENTORS.
DANIEL C. EIPPER
RAYMOND C. WEBER
BY
Bruno C. Sechler
ATTORNEY

Jan. 1, 1957 D. C. EIPPER ET AL 2,775,821
APPARATUS FOR PRESETTING CUTTERS FOR USE IN A MACHINE TOOL
Filed May 25, 1953 2 Sheets-Sheet 2

INVENTORS.
DANIEL C. EIPPER
RAYMOND C. WEBER
BY

ATTORNEY

United States Patent Office 2,775,821
Patented Jan. 1, 1957

2,775,821

APPARATUS FOR PRESETTING CUTTERS FOR USE IN A MACHINE TOOL

Daniel C. Eipper and Raymond C. Weber, Moline, Ill., assignors to Moline Tool Company, Moline, Ill., a corporation of Illinois Application May 25, 1953, Serial No. 357,202

1 Claim. (Cl. 33—185)

The invention comprises a new method of operating those types of machine tools generally referred to as metal working tools. Metal working tools shape materials, usually metals, by means of a cutter rigidly held in a holder which removes particles of the material. As the operation proceeds the cutter wears away, becomes dull, and must be sharpened which reduces the length of the cutter.

The invention applies to the use of metal working tools of this type to produce pieces, or holes in pieces, of a uniform size. This operation involves adjusting the position of the cutting edge of the cutter relative to the holder.

In the customary operation of such a metal working tool the dull cutter is removed, sharpened, the sharpened cutter replaced in the holder, and then properly adjusted in position. This may be done by taking a random cut, calipering the piece, adjusting the tool, and repeating with another random cut and recalipering until the desired adjustment is reached.

Various gauging devices for setting the tool in the holder are known, but all such devices require that a large expensive metal working tool be kept out of operation while the cutter is being adjusted either by cut and try methods or by a gauge.

The invention consists of a new method of operating such tools by sharpening a plurality of cutters, placing each cutter in its own sheath in such manner that, if any sheath is substituted for another in the holder, the metal working tool will produce pieces of the same size after the change as it did before. This does not require any delay for adjusting the cutter after it is mounted in the holder.

Where a metal working tool has several tool holders, such as a cylinder boring machine boring several cylinders simultaneously, the saving of time in setting each tool is multiplied by the number of holders since all the cutters must be idle while any one is being adjusted.

Where a number of machine tools are turning out the same size of pieces, the invention has the further advantage of eliminating personal equation. It is well known that each mechanic will read a gauge used in setting the tool in the holder slightly different. If the tools for all of the machines are adjusted in the sheaths by the same master mechanic whose task it is to grind the tools and to adjust their position in the sheaths, a greater uniformity of dimension of the pieces is achieved. No checking of dimension or adjustment of cutters is then required on the part of the operators of the several machines.

In using the preferred method of adjusting the position of the cutter in the sheath described below, even the master mechanic need not read a gauge but merely bring the pointer back to zero.

While the invention is not limited to the use of a particular type of sheath or gauging device, the invention also comprises a type of sheath particularly well adapted to the practice of the method and a particular type of apparatus for positioning each cutter in its sheath.

While the invention is not limited to use on boring machines or lathes, the invention will be illustrated as applied to boring machines boring gas engine cylinders. Such boring machines have a spindle in which a cutter is mounted. At present the adjustment of the position of the cutter in the spindle to give the precise diameter of hole desired becomes necessary every time the cutter has become dull and is replaced by a new cutter. Since these holes have to be bored accurate to a fraction of a thousandth of an inch, the cutter must be accurately positioned in the spindle. While the operator is engaged in making this adjustment the machine is out of production.

The personal equation entering into the adjustments made by different operators is completely eliminated by this method.

The invention proposes to substitute for the adjustment by the operator of the position of the cutting edge relative to the spindle the mere substitution of one sheath containing a sharp cutter for another sheath containing the dull or worn out cutter. This substitution will not delay the continued operation of the machine appreciably, and the operator need not make any adjustment whatsoever. This method may be practiced by providing a series of duplicate sheaths, each sheath having a longitudinal recess within which a cutter can be adjusted longitudinally relative to a bearing surface of the sheath and providing a recess in the boring tool having an abutment against which the bearing surface of any of these sheaths may rest.

If these sheaths are to be used interchangeably in a number of boring tools, the spindle of each tool will have an abutment similarly located relative to the axis of the spindle. Each cutter will be mounted in its own sheath so that the distance between the cutting edge of the cutter and the bearing surface of the sheath is the same.

The practice of this method is independent of any particular gauging device. This adjustment may be made in any manner desired.

The invention also includes a sheath particularly well adapted for the practice of the novel method of operating machine tools just described.

The preferred form of sheath is cylindrical, broached for a cutter of rectangular section, and provided with means for moving the cutter axially in the sheath and for clamping it in that position. The cylinder has flat areas used for orienting the cutting edge in the holder and in the device used for adjusting the position of the cutting edge of the cutter in the sheath.

The apparatus used to adjust the position of the cutter in the sheath includes a turret having recesses into one of which a sheath can be inserted and into another, a dimension bar. The dimension bar is of such a length that, when mounted in its recess and the turret is rotated about its axis, the outer end of the dimension bar will be in such a position relative to the turret axis as the cutting edge should occupy when the cutter is properly set. In a boring tool the end of the dimension bar will move in an arc of the same radius as that of the hole which the cutter is to bore. At right angles to the axis of the turret is an indicator which can be moved toward or away from that axis. This indicator may be moved so that the indicator reads zero or some other desired value when the indicator rod is in touch with the dimension bar carried by the turret.

The turret is then revolved so as to swing the cutter mounted in a sheath that has been placed in the recess into contact with and past the feeler of the indicator. The cutter will engage the feeler of the indicator and if the indication is not the same as when the dimension bar was in touch with the feeler the cutter is moved relative to the sheath which carries it until the reading of the indicator is the same as when the dimension bar was in touch with the feeler of the indicator. In the form illustrated this may conveniently be achieved by a screw in the rear of the sheath which can be reached by an adjusting tool extending into the rear of the turret. When the cutter in each sheath is thus adjusted so that the cutting surface of the cutter is at the same distance from the bearing surface of the sheath as the cutter in every one of the other sheaths, the sheaths may be used interchangeably on any one of a number of machines adapted to receive these sheaths in their holders.

When a cutter dulls, the operator merely substitutes another sheath in his tool holder and the operation of the machine is not appreciably delayed.

One object of the invention is to provide a method of operating machine tools that permits setting the cutters in sheaths in such a manner that any sheath having a preset cutter may be inserted in the tool holder with the assurance that the resulting machined piece will be of the right size.

Another object of the invention is to provide a sheath for holding the tool having means for adjusting the position of the tool in the sheath relative to the bearing surface of the sheath that will rest against an abutment in the tool holder.

Another object is to provide a sheath consisting of a cylindrical bar having a central hole conforming to the cross section of the cutter, a screw to adjust the position of the cutter in the sheath, and two flat areas on opposite sides of the sheath for alignment.

Another object of the invention is to provide a gauging device facilitating the setting of the cutter in each of said sheaths to make the distance from the cutting edge to the bearing surface of the sheath, the same in all sheaths.

Still another object of the invention is to provide a gauging device for setting cutters in sheaths to be used in boring tools wherein the cutting edge of the cutter, when contacting the feeler of the indicator is travelling along a path having the same radius as the inside of the cylinder to be bored.

Still another object of the invention is to provide a gauging device for setting cutters in sheaths to be used in boring tools wherein the cutter is mounted in such manner that when the cutting edge of the cutter contacts the feeler of the indicator it is not only travelling along a path having the same radius as the radius of the hole to be bored but also making the same angle with the axis of the feeler as the cutter in the machine tool makes with the radius of the bore at the point where the cutter touches the material.

A further object of the invention is to provide a gauging device having a turret in which the sheath is mounted and a support for a feeler adjustable at right angles to the path of the tool.

A further object of the invention is to provide such a gauging device having a turret in which sheaths can be mounted and in which one or more dimension rods may also be mounted to adjust the position of the feeler relative to the turret for use in setting the position of the cutters in the sheaths.

While not limited to a boring tool, the drawing attached shows the invention as applied to setting the cutters in a sheath which is to be mounted in a boring mill to bore engine cylinders to a desired size.

Figure 1:
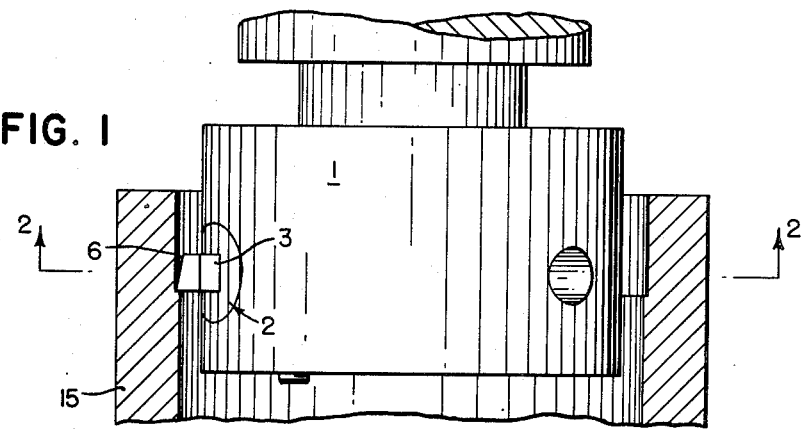
Fig. 1 shows, in elevation, the boring bar in which a tool carried in a sheath is mounted to bore a cylinder shown in section.
Figure 2:
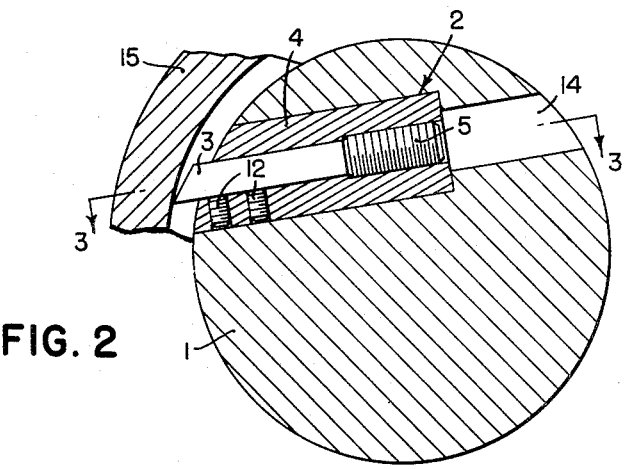
Fig. 2 is a horizontal section along lines 2—2 of Fig. 1.
Figure 3:
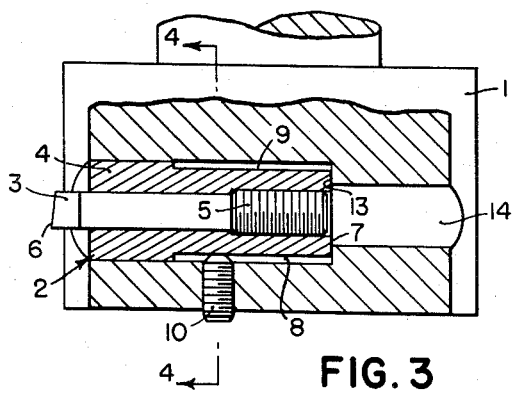
Fig. 3 is a vertical section along lines 3—3 of Fig. 2.
Figure 4:
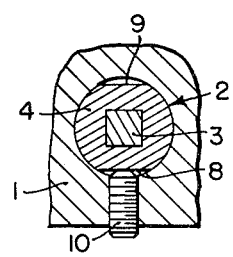
Fig. 4 is a section along line 4—4 in Fig. 3.
Figure 5:
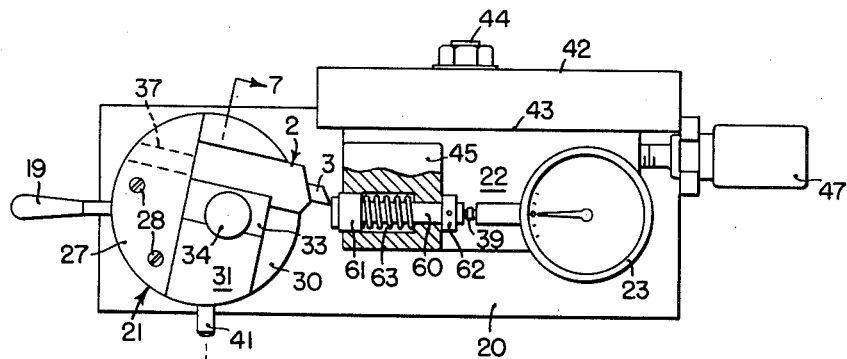
Fig. 5 is a plan view of the gauge used in setting the tool, partly in section.
Figure 6:
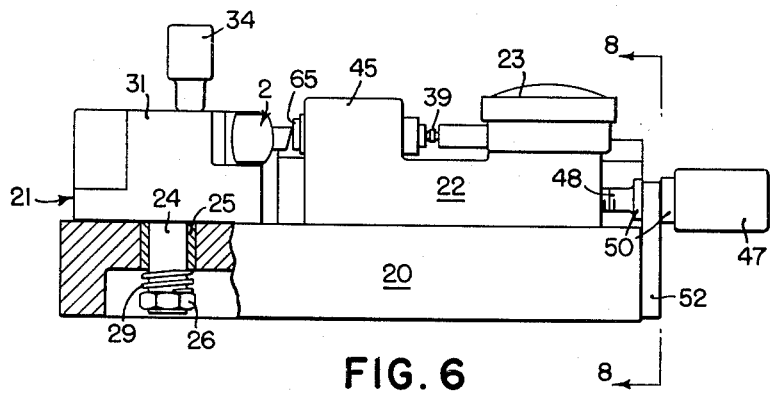
Fig. 6 is an elevation of the gauge shown in Fig. 5, partly in section.

1 indicates any tool holder, in this instance a boring bar. 2 indicates a sheath carried by the tool holder which carries a cutter 3. The sheath may consist of a cylindrical piece of stock 4 having a round or square longitudinal hole in which the cutter 3 slides freely. The rear portion of this square hole may be threaded for a screw 5 of larger diameter than the sides of the square hole. By turning the screw 5 the cutting edge 6 of the cutter may be adjusted axially relative to the bearing surface 7 forming the rear end of the sheath. The sheath has two parallel flat surfaces 8, 9. One of these flat surfaces 8 is engaged by the screw 10. This prevents the sheath turning on its axis when mounted in the holder. The other flat surface 9 rests on a flat surface 32 in Fig. 7 when the position of the tool relative to the bearing surface 7 is being adjusted. The sheath also carries two small screws 12 which hold the tool 3 rigid in the sheath after its longitudinal position has been determined.

The tool holder carries a pocket for the sheath and the rear side of this pocket has a shoulder 13 against which the bearing surface of the sheath rests. The pocket is illustrated as a bore extending through the boring bar, the smaller diameter section 14 giving access to the screw 5 and allowing the position of the tool to be varied axially so as to bore the cylinder block 15 to the desired diameter.

It will be obvious that if in each of two sheaths 2 the cutter 3 is set so that the distance from the cutting edge 6 to the shoulder 13 is the same, one sheath may be substituted for the other without altering the bore of the hole being bored. The position of the cutter in the sheath may be conveniently adjusted by the apparatus shown in Figures 5 to 8. The parts of this apparatus are all carried by a base 20. On this base a turret 21 which has provisions for holding a sheath 2 and a sliding block 22 are mounted. The sliding block carries an indicator 23 used in adjusting the position of the cutter 3 in the sheath.

The turret 21 may be rotatably supported in the base in any desired manner. It is here shown as having a stem 24 fitting into a bushing 25. The stem 24 may carry a nut 26 and a compressed coil spring 29 bearing against the base and the nut may be used to draw the turret against its seat on the block.

A segment of the turret is cut away and replaced by the block 27 which may be held in position by screw 28. Another segment 30 is cut away leaving a raised portion 31 having parallel sides. A groove having a bottom 32 is milled across this raised portion. The sheath to be adjusted is placed on the bottom surface 32 so that surface 9 lies against surface 32 and a clamping block 33 is drawn down by screw 34 so that the inclined surface 35 forces the sheath 2 against the edge 36 with the rear end of the sheath resting against block 27. This block carries a bore 37 through which a screw driver or other rod may be inserted to move the cutter 3 lengthwise by turning the screw 5.

The turret also carries one or more radial holes 40 into which "dimension rods" 41 may be inserted.

Each dimension rod is of such length that when it is mounted in the radial hole, its outer end will be at the precise distance from the center of the turret that a cutting edge is to be from the axis of the boring bar when boring holes of a particular diameter. The base 20 also carries a guide bar 42 having a lip 43 firmly attached thereto. The sliding block 22 fits under this lip and when the proper position of the block relative to the guide is determined, it is firmly clamped thereto by pulling up on the bolt 44. The block 22 has a raised portion 45 and provides a support for the indicator 23. The block 22 may be moved longitudinally on the base 20 by turning knob 47 of screw 48 which extends into a threaded hole in block 22. This screw has two collars 50. These collars bear against tongues 51 of strip 52 which is fastened to block 20 by screws 53 or in any other manner.

The raised portion 45 of block 22 carries a rod 60 having a head 61 guided in a bore in the raised portion at one end and a collar 62 at the other end. A spring 63 pushes the rod to the left in Figure 5 so that the collar 62 bears against the side of portion 45. The head 61 may be faced with tool steel 65 or with tungsten carbide to resist wear. The face 65 is truly normal to the axis of the rod.

In the use of this device the proper dimension rod for the diameter to be bored is placed in hole 40. By means of handle 19 the turret is turned to bring the end of the dimension rod in touch with head 61 of the rod 60 moving it against the spring 63 against feeler 39 of the indicator 23.

Figure 7:
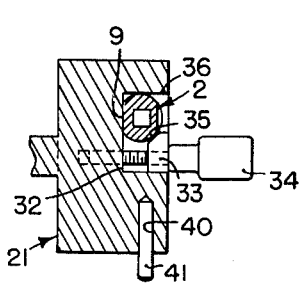
Fig. 7 is a vertical section along line 7—7 in Fig. 5.
Figure 8:
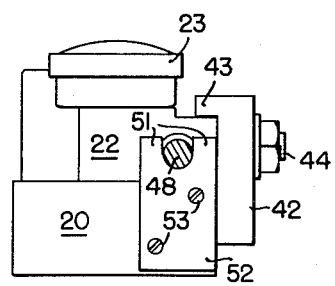
Fig. 8 is a vertical section along line 8—8 in Fig. 6.

By loosening bolt 44 and turning knob 47 the block 22 is moved longitudinally until the pointer of the indicator registers zero or some other desired value. Bolt 44 is now tightened. A sheath containing a cutter is now clamped in place by clamping block 33 and screw 34 as shown in Figure 7 with the end of the sheath bearing against the surface of block 27. By turning the turret into the position shown in Figure 5, the cutting edge of the tool is brought against the face 65 at the end of the rod 60. As the cutting edge moves across this face it will slowly recede and at its maximum recession the position of the indicator is noted. If the indicator reads the same as when the dimension rod was in place, the cutter is properly set in the sheath. If not, a screw driver or suitable wrench is inserted through bore 37 to adjust the screw 5 to move the cutter 3 longitudinally until the indicator reads zero.

When the adjustment of the cutter on that sheath is finished screws 12 are drawn up. A number of sheaths are thus adjusted.

In the practice of the method any one of these sheaths may now be inserted in holder 1 and the bore in piece 15 will be of the desired size.

Where a number of machines are engaged in boring the same sized hole, the holders are duplicates of each other so that any one of the sheaths in which a tool has been adjusted as described may be inserted indiscriminately in any one of the holders.

We claim:

An apparatus for setting a plurality of cutters in their respective tool carrying sheaths to permit interchange of tool carrying sheaths in a boring machine without affecting the diameter of the bore, having in combination, a base, a turret supported on said base to permit rotation about a vertical axis, means for clamping tool carrying sheaths in a predetermined position on said turret, a cutting tool projecting from each tool carrying sheath, a block supported by said base and movable horizontally along an axis intersecting said turret axis, a vertical wall on said base guiding the movement of said block, a cylindrical hole extending along the block axis, a plunger movable in said hole, a stop limiting the movement of the plunger toward said turret, spring means biasing said plunger against said stop, an indicator mounted on the block to detect when a cutter carried in a tool carrying sheath on the turret moves said plunger away from said stop as the turret is turned about its axis, and means to clamp said block to said vertical wall in an adjusted position.

References Cited in the file of this patent
UNITED STATES PATENTS

| | | |
|---|---|---|
| 1,231,347 | Heiser | June 26, 1917 |
| 1,404,989 | Marcy | Jan. 31, 1922 |
| 2,349,330 | Auders | May 23, 1944 |
| 2,500,224 | Werner et al. | Mar. 14, 1950 |